(12) United States Patent
Katoh et al.

(10) Patent No.: US 11,741,363 B2
(45) Date of Patent: Aug. 29, 2023

(54) COMPUTER-READABLE RECORDING MEDIUM, METHOD FOR LEARNING, AND LEARNING DEVICE

(71) Applicant: FUJITSU LIMITED, Kawasaki (JP)

(72) Inventors: Takashi Katoh, Kawasaki (JP); Kento Uemura, Kawasaki (JP); Suguru Yasutomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1186 days.

(21) Appl. No.: 16/287,494

(22) Filed: Feb. 27, 2019

(65) Prior Publication Data

US 2019/0286937 A1    Sep. 19, 2019

(30) Foreign Application Priority Data

Mar. 13, 2018    (JP) .................................. 2018-045963

(51) Int. Cl.

| | | |
|---|---|---|
| *G06N 20/00* | (2019.01) | |
| *G06N 3/084* | (2023.01) | |
| *G06F 18/2132* | (2023.01) | |
| *G06F 18/214* | (2023.01) | |
| *G06V 10/764* | (2022.01) | |
| *G06V 10/774* | (2022.01) | |
| *G06V 10/44* | (2022.01) | |

(52) U.S. Cl.
CPC ........... *G06N 3/084* (2013.01); *G06F 18/214* (2023.01); *G06F 18/2132* (2023.01); *G06N 20/00* (2019.01); *G06V 10/454* (2022.01); *G06V 10/764* (2022.01); *G06V 10/774* (2022.01)

(58) Field of Classification Search
CPC .... G06N 3/0454; G06N 3/0472; G06N 3/084; G06N 20/00; G06K 9/6284; G06K 9/627; G06K 9/6234; G06K 9/6256; G06V 10/454

See application file for complete search history.

(56) References Cited

U.S. PATENT DOCUMENTS

| | | | |
|---|---|---|---|
| 8,494,464 B1* | 7/2013 | Kadambe ................. | H04K 3/45 455/67.11 |
| 8,855,375 B2* | 10/2014 | Macciola ............. | H04N 1/3878 358/448 |
| 10,594,677 B2* | 3/2020 | Oberheide .............. | H04L 67/51 |
| 11,477,202 B2* | 10/2022 | De Knijf ............... | H04L 63/102 |
| 2009/0028443 A1* | 1/2009 | Chen .................... | G06K 9/6292 382/224 |
| 2012/0117069 A1 | 5/2012 | Kawanishi et al. | |

(Continued)

FOREIGN PATENT DOCUMENTS

| | | |
|---|---|---|
| JP | 2013-152654 | 8/2013 |
| JP | 2016-18358 | 2/2016 |
| WO | WO 2011/092793 A1 | 8/2011 |

*Primary Examiner* — Congvan Tran
(74) *Attorney, Agent, or Firm* — STAAS & HALSEY LLP

(57) ABSTRACT

A learning device executes learning of a discriminator that discriminates object data to a known class included in training data or an unknown class not included in the training data, using the training data. The learning device then generates a feature value of the unknown class, from a feature value of a plurality of layers of the discriminator, by at least a part of the training data in the layers. The learning device then executes the learning of the discriminator so that a feature value of the known class and the generated feature value of the unknown class are separated.

9 Claims, 15 Drawing Sheets

(56) References Cited

U.S. PATENT DOCUMENTS

| | | | |
|---|---|---|---|
| 2013/0114429 A1* | 5/2013 | Jonsson | H04L 1/0038 |
| | | | 370/252 |
| 2015/0052090 A1* | 2/2015 | Lin | G06N 7/005 |
| | | | 706/12 |
| 2016/0012333 A1 | 1/2016 | Takahashi | |
| 2018/0101770 A1* | 4/2018 | Tanaka | G06N 3/0472 |
| 2018/0336439 A1* | 11/2018 | Kliger | G06N 3/088 |
| 2019/0080205 A1* | 3/2019 | Kaufhold | G06N 3/0472 |

* cited by examiner

# US 11,741,363 B2

COMPUTER-READABLE RECORDING MEDIUM, METHOD FOR LEARNING, AND LEARNING DEVICE

CROSS-REFERENCE TO RELATED APPLICATION

This application is based upon and claims the benefit of priority of the prior Japanese Patent Application No. 2018-045963, filed on Mar. 13, 2018, the entire contents of which are incorporated herein by reference.

FIELD

The embodiments discussed herein are related to a computer-readable recording medium, a method for learning, and a learning device.

BACKGROUND

In open set recognition, data is discriminated not to be included in a known class by using a learned model. As a technique related to the open set recognition, a method of discriminating an unknown class by setting a region corresponding to the unknown class in the feature space by the known class has been known.

FIG. 15 is a diagram for explaining the open set recognition. As illustrated in FIG. 15, learning data of a known class is projected to the feature space, and the feature space is divided into subspaces of space 1 in which the class 1 belongs, space 2 in which the class 2 belongs, and space 3 in which the class 3 belongs. When the open set recognition is applied, data that does not belong to the subspaces of the known class is detected as data of an unknown class. For example, when data X1 to be discriminated is classified into the space 3, the data X1 is discriminated as the class 3. When data X2 to be discriminated is not classified into any desired space, the data X2 is discriminated as the unknown class.

When a class not included in the learning data is supplied, the open set recognition such as the above is used to interrupt the process by returning an error, before a serious problem occurs due to an erroneous detection. Moreover, the open set recognition is used for sequential learning, by dividing the class into a learned class and an unlearned class, only labeling the unlearned class, and generating a dedicated classifier (see Japanese Laid-open Patent Publication No. 2013-152654, International Publication No. 2011/092793, and Japanese Laid-open Patent Publication No. 2016-18358).

However, in the technique described above, the detection accuracy of the unknown class is not high. More specifically, because the feature space used for space division is generated by classifying data of the known class, the feature space may be a feature space not allowing unknown class data and known class data to be correctly divided in some cases. Consequently, detection of unknown class data may be failed.

FIG. 16 is a diagram for explaining an erroneous detection of an unknown class. In the method described above, the space is divided without taking the features of the unknown class data into account. Consequently, the feature amount (i.e. feature value) of the unknown class data may be overlapped with or come close to the feature amount of the known class data on the feature space. In this case, as illustrated in FIG. 16, data of an unknown class Y that is not supposed to belong to any desired known class may be classified into the class 1 or the class 3. Consequently, the unknown class is erroneously detected.

SUMMARY

According to an aspect of an embodiment, a non-transitory computer-readable recording medium stores therein a program that causes a computer to execute a process. The process includes executing learning of a discriminator that discriminates object data to a known class included in training data or an unknown class not included in the training data, using the training data; generating a feature value of the unknown class from a feature value of a plurality of layers of the discriminator, by at least a part of the training data in the layers; and executing the learning of the discriminator so that a feature value of the known class and the generated feature value of the unknown class are separated.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. It is to be understood that this invention is not limited to the embodiments. Moreover, the embodiments may be suitably combined with each other within consistent range.

[a] First Embodiment

Explanation of Learning Device

Figure 1:
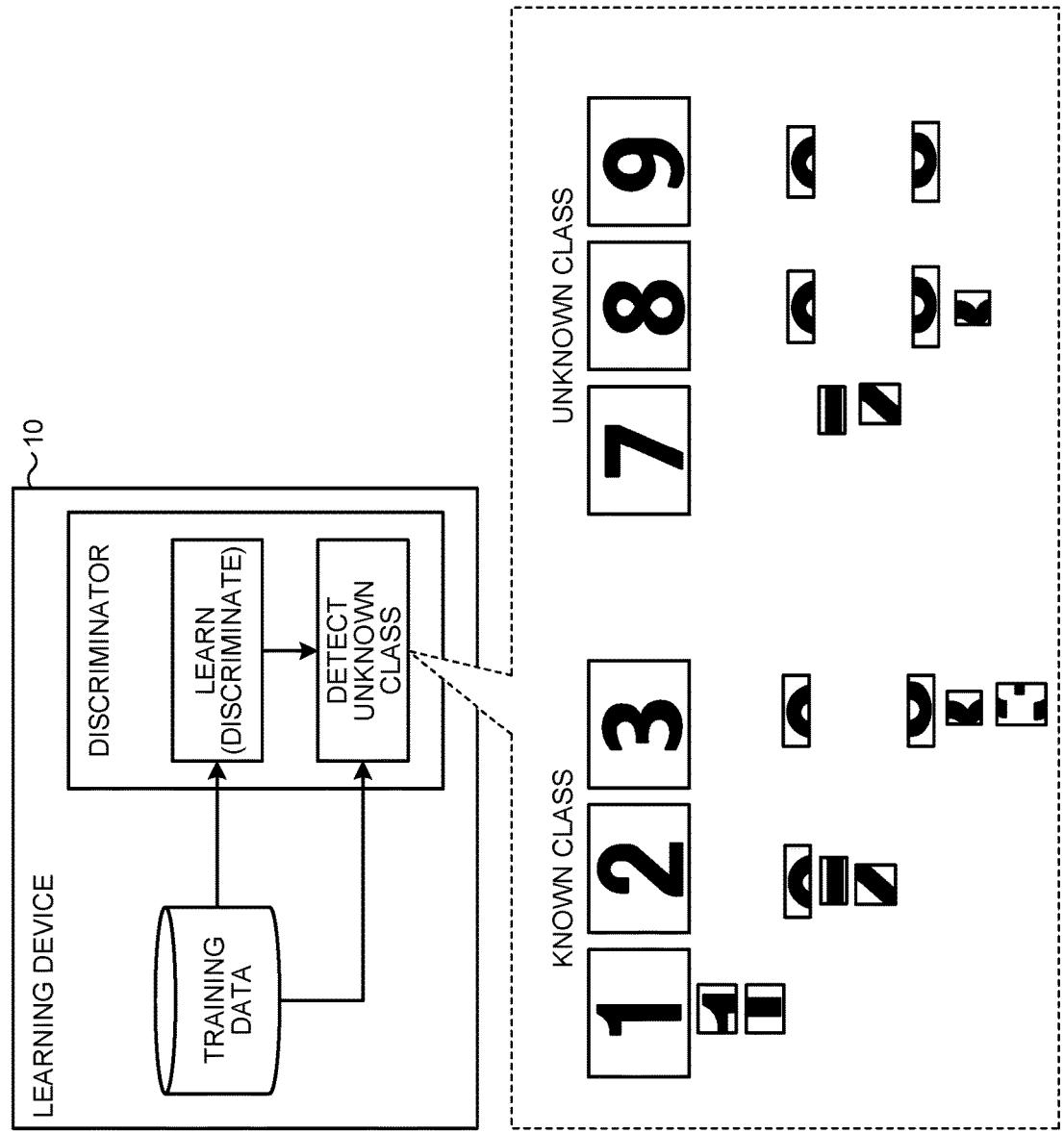
FIG. 1 is a diagram for explaining a learning device according to a first embodiment.

FIG. 1 is a diagram for explaining a learning device according to a first embodiment. A learning device 10 illustrated in FIG. 1 is an example of a computer device that executes learning of a discriminator (hereinafter, may be referred to as a class discriminator) for discriminating object data to a known class included in training data or an unknown class not included in the training data.

In a state when machine learning or deep learning (DL) may be applied to data of a known class included in training data and an unknown class not included in the training data, the learning device 10 learns a discriminator capable of correctly detecting data of an unknown class that is not included in the training data to be learned as the unknown class, when the data of an unknown class is supplied. For example, the learning device 10 learns the discriminator so as to be able to discriminate input image data as a cat or a dog, by using image data the class of which is a cat and image data the class of which is a dog. The learning device 10 also learns the discriminator so as to be able to detect input image data of a bird is unknown class data.

More specifically, the learning device 10 learns the discriminator by using training data. The learning device 10 generates an unknown class feature amount corresponding to an unknown class, from the feature amount of a plurality of layers of the discriminator, by at least a part of the training data in the layers. The learning device 10 then learns the discriminator so that the feature amount of the known class and the unknown class is separated.

In this example, the data to be applied is not entirely irrelevant to the known class data, even if the data is unknown class data, and it is possible to assume that the unknown class data and the known class data belong to the same category. For example, when the known class data is a character image, the unknown class data is often another character image, and is not an animal image or the like.

The learning device 10 according to the first embodiment generates a feature space used for detecting an unknown class, by generating the feature amount of the unknown class on the basis of the feature amount of the known class. For example, as illustrated in FIG. 1, the learning device 10 estimates that image data of "7", image data of "8", and image data of "9", which are unknown class data, each include a combination of intermediate feature amounts obtained by dividing image data of "1", image data of "2", and image data of "3" that are each image data of a known class.

The learning device 10 then generates a virtual feature amount corresponding to the unknown class, by combining the intermediate feature amounts used for generating the final feature space for dividing the known class. The learning device 10 then generates the feature space of the unknown class on the basis of the virtual feature amount, and detects the unknown class by using the feature space of the unknown class. Consequently, it is possible to improve the detection accuracy of the unknown class.

Functional Configuration

Figure 2:
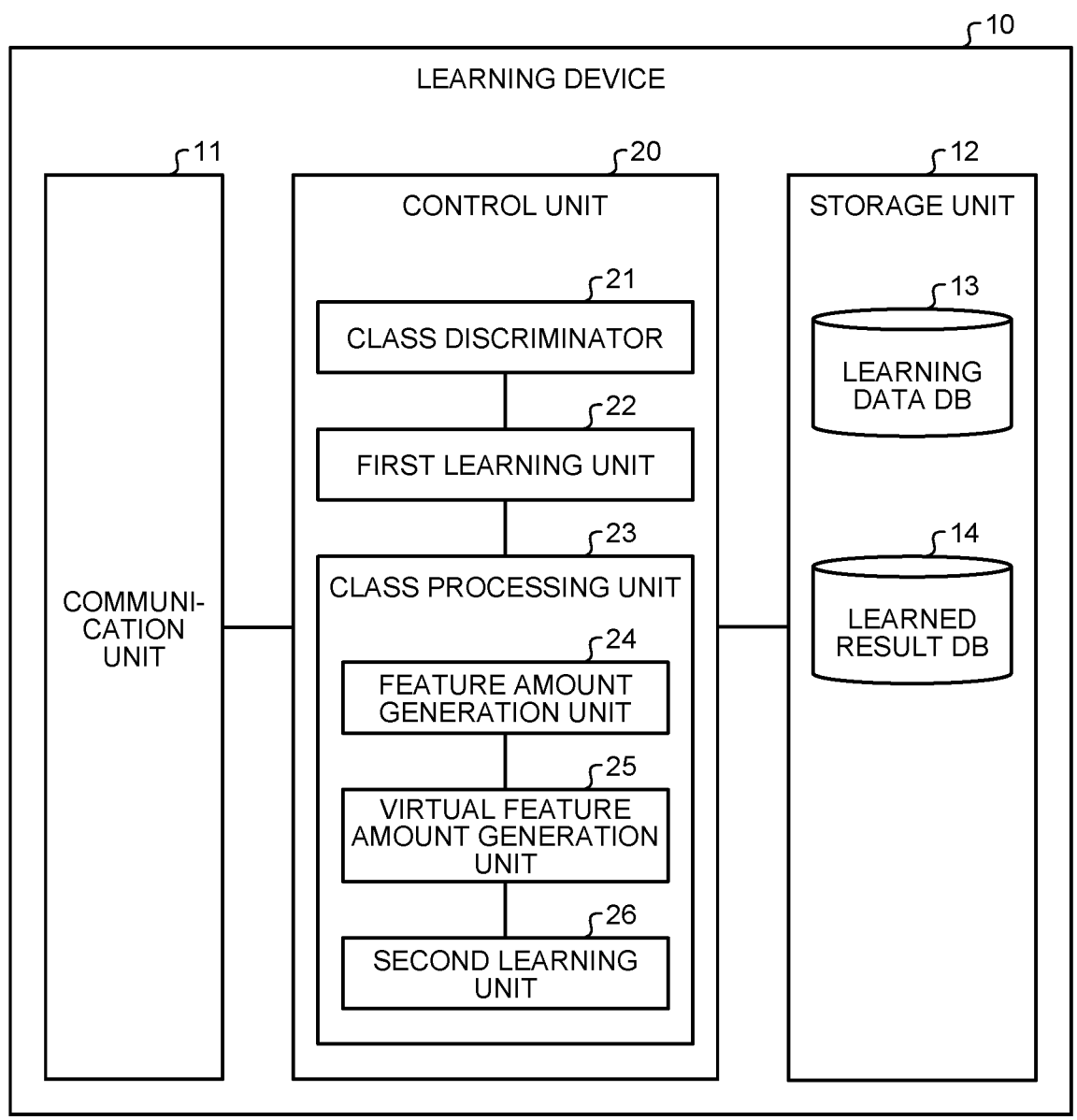
FIG. 2 is a functional block diagram illustrating a functional configuration of the learning device according to the first embodiment.

FIG. 2 is a functional block diagram illustrating a functional configuration of the learning device according to the first embodiment. As illustrated in FIG. 2, the learning device 10 includes a communication unit 11, a storage unit 12, and a control unit 20.

The communication unit 11 is a processing unit that controls communication with another device. For example, the communication unit 11 is a communication interface. For example, the communication unit 11 receives an instruction to start processing from an administrator's terminal. Moreover, the communication unit 11 receives training data to be learned from the administrator's terminal and the like, and stores the training data and the like in learning data database (DB) 13.

The storage unit 12 is an example of a storage device that stores therein computer programs and data. For example, the storage unit 12 is memory and a hard disk. This storage unit 12 stores therein the learning data DB 13 and learned result DB 14.

The learning data DB 13 is a database that stores therein training data that is data to be learned. More specifically, the learning data DB 13 stores therein data of a known class the class of which is known, and for example, stores "class and data" in an associated manner.

The learned result DB 14 is a database that stores therein learned results. For example, the learned result DB 14 stores therein discriminated results (classified results) of learning data by the control unit 20, various parameters learned by the machine learning and the deep learning, and the like.

The control unit 20 is a processing unit that controls the entire processing of the learning device 10. For example, the control unit 20 is a processor and the like. The control unit 20 includes a class discriminator 21, a first learning unit 22, and a class processing unit 23. The class discriminator 21, the first learning unit 22, and the class processing unit 23 may also be implemented by a process executed by a processor and the like.

The class discriminator 21 is a processing unit that discriminates the class of input data that is supplied. More specifically, the class discriminator 21 is a discriminator (learning machine) applied with a learning model using a neural network and the like learned by learning units, which will be described below, and discriminates the class of input data. For example, the class discriminator 21 includes at least one feature generator and a discriminator (classifier), generates a feature amount from input data, and discriminates the class by using the generated feature amount.

Moreover, the class discriminator 21 generates a feature amount from input data, and when the generated feature amount falls under an unknown class region, the class discriminator 21 detects that the input data is unknown class data that is not included in the class of the training data. In this process, the class discriminator 21 can also execute an error process of outputting error information to the screen and the administrator's terminal.

The first learning unit 22 is a processing unit that learns the class discriminator 21, using the training data that is known class data stored in the learning data DB 13. More specifically, the first learning unit 22 learns a learning model using a neural network and the like, by a back propagation method and the like so that each class included in the training data can be discriminated (classified).

The class processing unit 23 includes a feature amount generation unit 24, a virtual feature amount generation unit 25, and a second learning unit 26. The class processing unit 23 is a processing unit that learns the class discriminator 21 so as to be able to detect unknown class data is the unknown class data, when the unknown class data is supplied.

The feature amount generation unit 24 is a processing unit that generates a feature amount of the training data, by using the layers of the class discriminator 21 while learning the class discriminator 21. For example, when the class discriminator 21 is a learning machine using a neural network, the feature amount generation unit 24 acquires the feature amounts output from the layers of an input layer and an intermediate layer, and outputs the feature amounts to the virtual feature amount generation unit 25.

Moreover, when the class discriminator 21 includes a plurality of feature amount generators, the feature amount generation unit 24 acquires the feature amounts output from the feature amount generators, and outputs the feature amounts to the virtual feature amount generation unit 25. Furthermore, when the class discriminator 21 includes the feature amount generators, and the feature amount generators each include the layers, the feature amount generation unit 24 acquires the feature amounts output from the layers or the feature amount generators, and outputs the feature amounts to the virtual feature amount generation unit 25.

The virtual feature amount generation unit 25 is a processing unit that generates an unknown class feature amount corresponding to an unknown class, from the feature amounts of the layers, by at least a part of the training data. More specifically, while learning the class discriminator 21 that classifies the class of training data, which is learning data, the virtual feature amount generation unit 25 generates a virtual feature amount that corresponds to unknown class data and that is an example of the unknown class feature amount, by combining the intermediate feature amounts.

For example, while learning, the virtual feature amount generation unit 25 can generate a virtual feature amount, by randomly combining the values of the dimensions of the feature amounts output from the layers and the like (method 1-1). Moreover, the virtual feature amount generation unit 25 can randomly generate a feature amount according to the distribution (average and dispersion) of the feature amounts that is being learned (method 1-2).

The second learning unit 26 is a processing unit that learns a feature space allowing unknown class data and virtual unknown class data to be divided, in addition to classifying the class of training data by the first learning unit. More specifically, in the learning machine that repeatedly generates the features in a multistage manner such as the deep learning and the like, the second learning unit 26 learns the class discriminator 21 so as to be able to detect the unknown class, in addition to a normal learning of discriminating class. The second learning unit 26 learns the class discriminator 21 by using the feature amount generated by the feature amount generation unit 24 and the virtual feature amount generated by the virtual feature amount generation unit 25.

For example, the second learning unit 26 creates an unknown class relative to the virtual unknown data anew, and learns so that the virtual unknown data is classified into the unknown class (method 2-1). Moreover, the second learning unit 26 learns so that the true class probably becomes maximum for the known class data, and the probability of any desired known class is reduced for the virtual unknown class data. The learning performed by the first learning unit 22 and the learning performed by the second learning unit 26 may be executed in different flows in parallel, or the learning performed by the second learning unit 26 may be performed at the same time when the learning is performed by the first learning unit 22.

SPECIFIC EXAMPLES

Next, with reference to FIG. 3 to FIG. 11, learning performed by the class processing unit 23 will be described. It is to be understood that the dimensions of the feature amounts described in these examples are merely examples and can be optionally set and modified.

Figure 3:
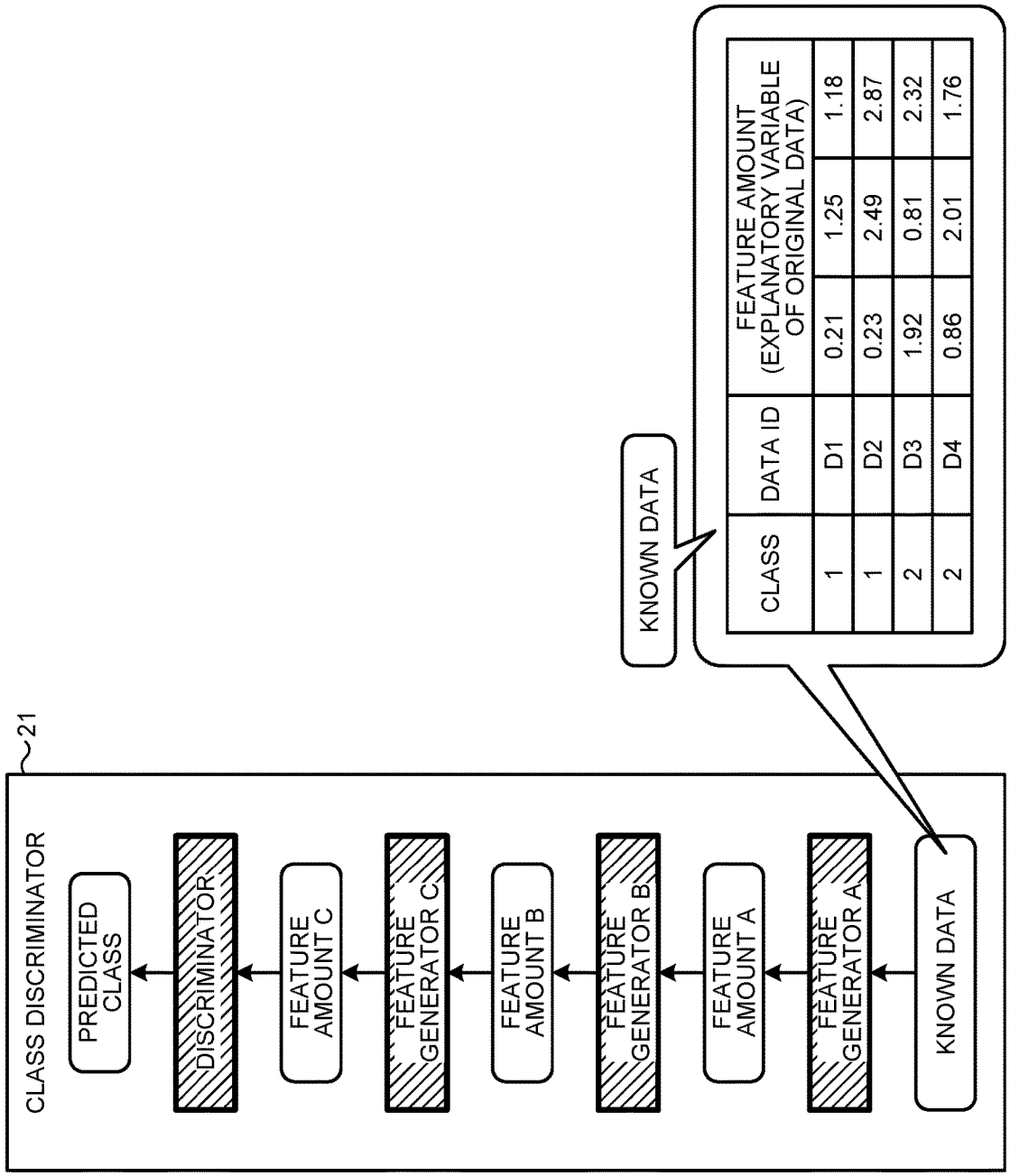
FIG. 3 is a diagram for explaining an example of the entire learning of classification performed by the learning device.

FIG. 3 is a diagram for explaining an example of the entire learning of classification performed by the learning device 10. As illustrated in FIG. 3, in this example, the class discriminator 21 includes a feature generator A, a feature generator B, a feature generator C, and a discriminator. Moreover, data D1 of a class 1, data D2 of a class 2, data D3 of a class 3, and data D4 of a class 4 are used as training data. In this example, the feature generator A corresponds to an input layer of a neural network (NN), the feature generator B and the feature generator C correspond to intermediate layers of the NN, and the discriminator corresponds to an output layer of the NN, for example. Moreover, when the feature generators each include a plurality of layers, a process, which will be described below, may be executed on each of the feature generators.

Moreover, the data of each known class includes a feature amount that is an explanatory variable of original data. For example, as illustrated in FIG. 3, the feature amounts of the data D1 of the class 1 are "0.21, 1.25, and 1.18", the feature amounts of the data D2 of the class 1 are "0.23, 2.49, and 2.87", the feature amounts of the data D3 of the class 2 are "1.92, 0.81, and 2.32", and the feature amounts of the data D4 of the class 2 are "0.86, 2.01, and 1.76".

Generation of Feature Amounts A

Figure 4:
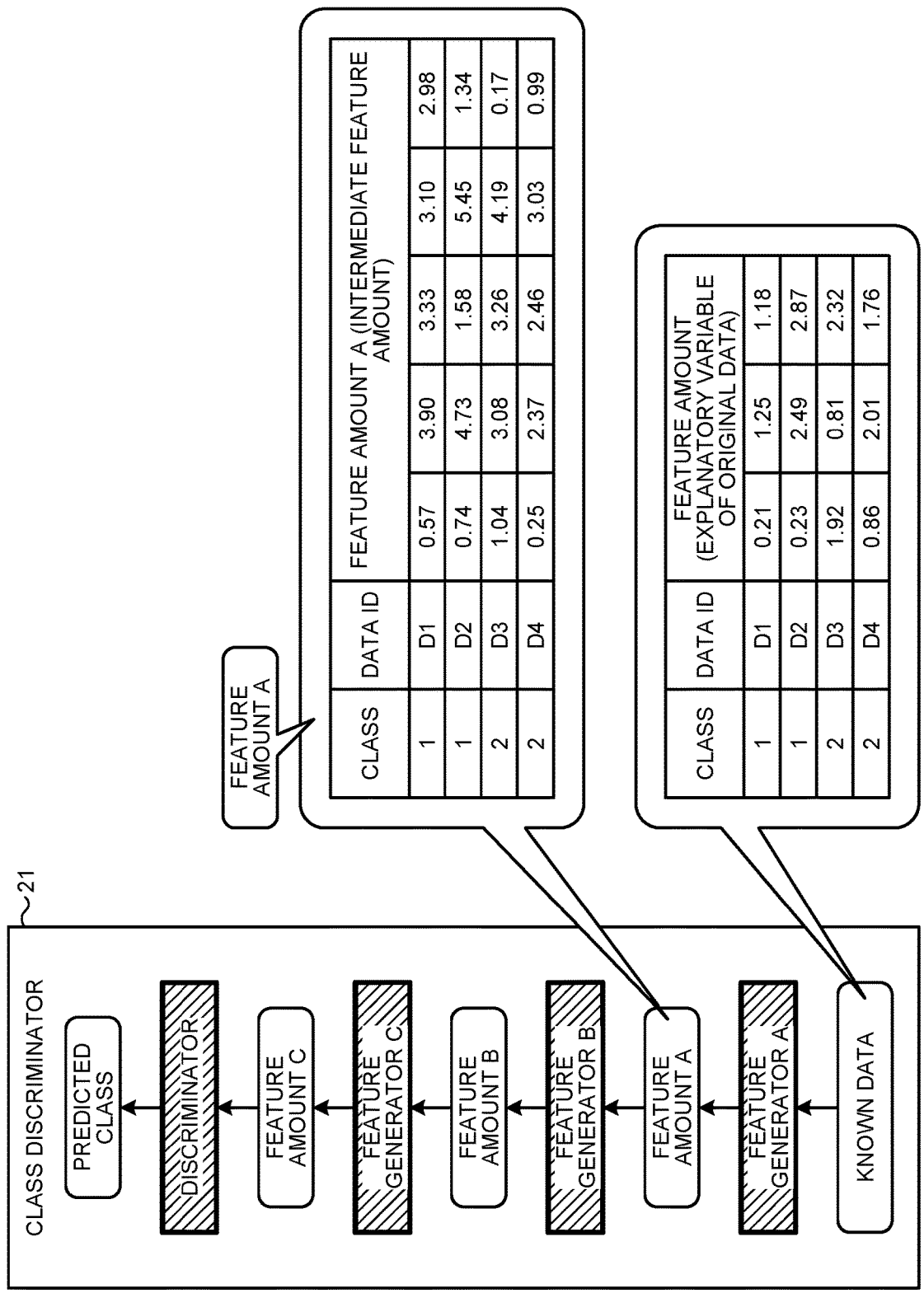
FIG. 4 is a diagram for explaining an example of generating feature amounts A.

In this state, the feature amount generation unit 24 supplies known data (data of known class) to the feature generator A, and acquires the intermediate feature amounts (feature amounts A) illustrated in FIG. 4. FIG. 4 is a diagram for explaining an example of generating the feature amounts A. As illustrated in FIG. 4, the feature amount generation unit 24 acquires "0.57, 3.90, 3.33, 3.10, and 2.98" as the feature amounts A of the data D1 of the class 1, acquires "0.74, 4.73, 1.58, 5.45, and 1.34" as the feature amounts A of the data D2 of the class 1, acquires "1.04, 3.08, 3.26, 4.19, and 0.17" as the feature amounts A of the data D3 of the class 2, and acquires "0.25, 2.37, 2.46, 3.03, and 0.99" as the feature amounts A of the data D4 of the class 2.

Figure 5:
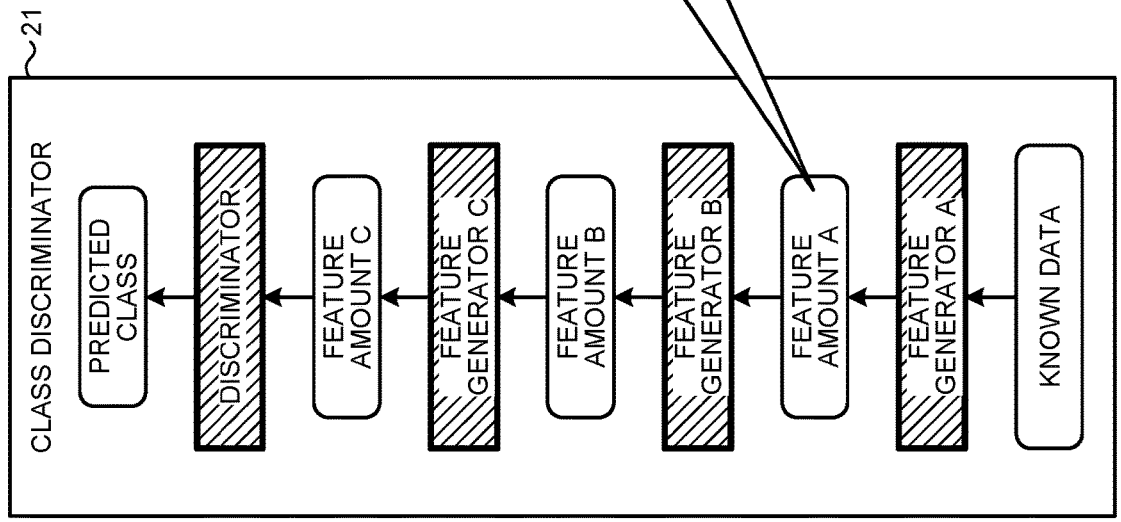
FIG. 5 is a diagram for explaining an example of generating virtual feature amounts based on the feature amounts A.

Next, the virtual feature amount generation unit 25 generates virtual feature amounts from the feature amounts A using the method 1-1 described above. FIG. 5 is a diagram for explaining an example of generating virtual feature amounts based on the feature amounts A. As illustrated in FIG. 5, the virtual feature amount generation unit 25 randomly acquires the feature amounts from the feature amounts A, and generates two virtual feature amounts.

For example, the virtual feature amount generation unit 25 combines the feature amounts A "1.04 and 0.17" of the data D3 of the class 2, the feature amounts A "3.90 and 3.33" of the data D1 of the class 1, and the feature amount A "3.03" of the data D4 of the class 2, and sets as the feature amounts "1.04, 3.90, 3.33, 3.03, and 0.17" of virtual data V1 of the virtual class. Moreover, the virtual feature amount generation unit 25 combines the feature amounts A "0.74 and 5.45" of the data D2 of the class 1, the feature amount A "2.37" of the data D4 of the class 2, and the feature amounts A "3.33 and 2.98" of the data D1 of the class 1, and sets as the feature amounts "0.74, 2.37, 3.33. 5.45, and 2.98" of virtual data V2 of the virtual class. In this example, the feature amounts of the two virtual unknown class data are generated. However, it is not limited thereto, and any desired number of pieces of virtual data may be generated.

Generation of Feature Amounts B

Figure 6:
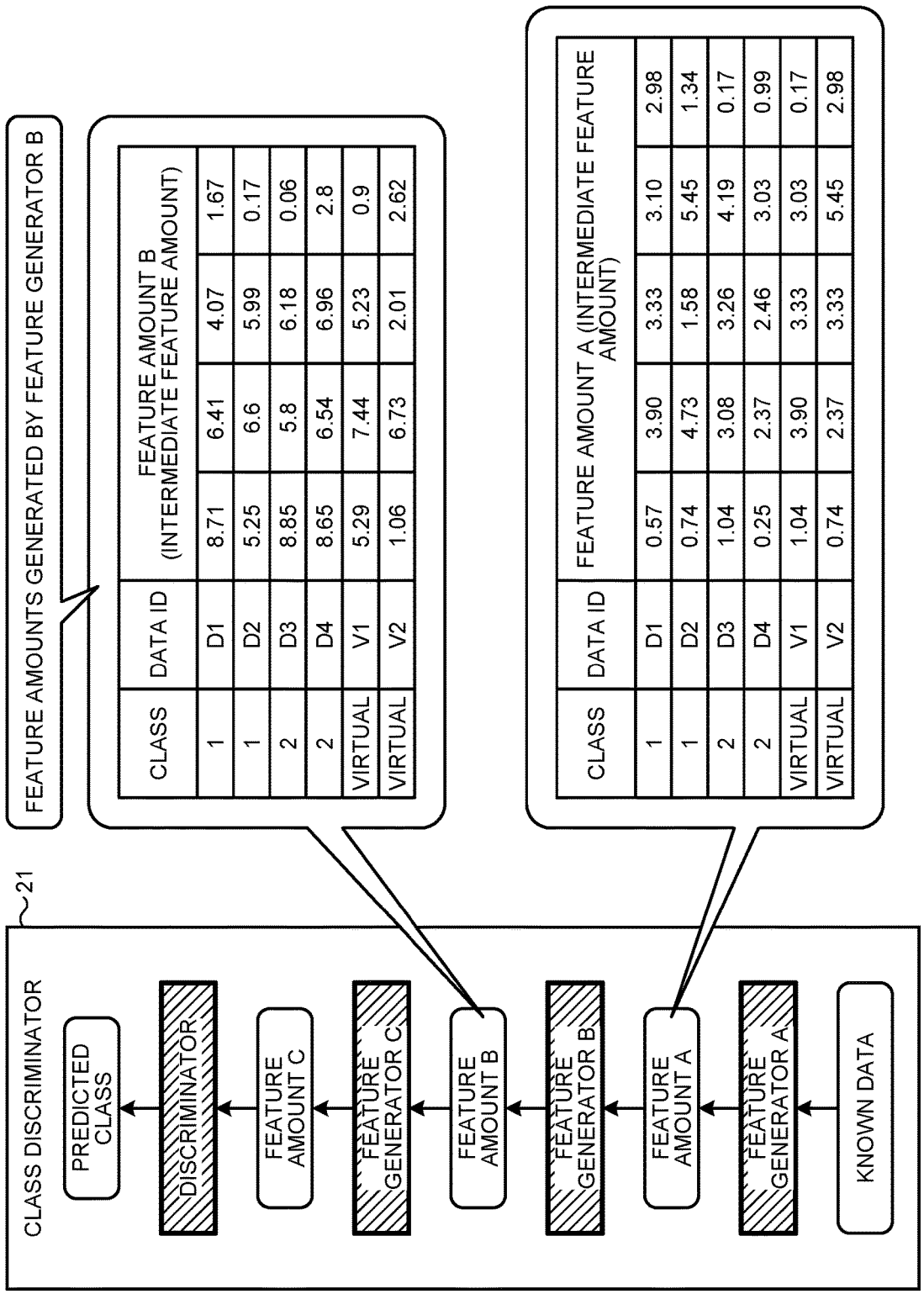
FIG. 6 is a diagram for explaining an example of generating feature amounts B.

Next, the feature amount generation unit 24 supplies the feature amounts A of six pieces of data generated in FIG. 5 to the feature generator B, and acquires the intermediate feature amounts (feature amounts B) illustrated in FIG. 6. FIG. 6 is a diagram for explaining an example of generating the feature amounts B. As illustrated in FIG. 6, the feature amount generation unit 24 acquires "8.71, 6.41, 4.07, and 1.67" as the feature amounts B of the data D1 of the class 1, acquires "5.25, 6.6, 5.99, and 0.17" as the feature amounts B of the data D2 of the class 1, acquires "8.85, 5.8, 6.18, and 0.06" as the feature amounts B of the data D3 of the class 2, and acquires "8.65, 6.54, 6.96, and 2.8" as the feature amounts B of the data D4 of the class 2. Similarly, the feature amount generation unit 24 acquires "5.29, 7.44, 5.23, and 0.9" as the feature amounts B of the virtual data V1 of the virtual class, and acquires "1.06, 6.73, 2.01, and 2.62" as the feature amounts B of the virtual data V2 of the virtual class.

Generation of Virtual Feature Amounts

Figure 7:
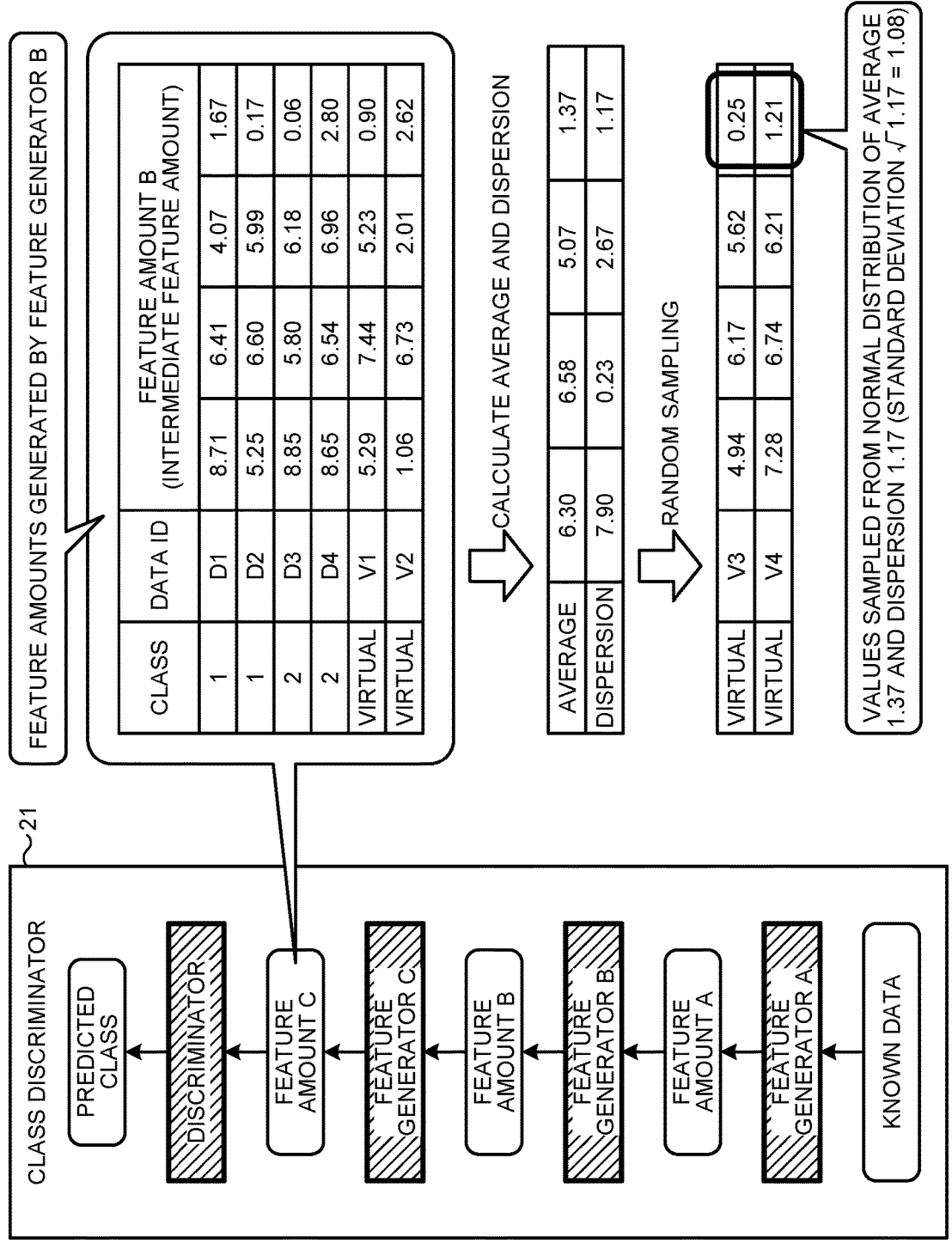
FIG. 7 is a diagram for explaining an example of generating virtual feature amounts based on the feature amounts B.

The virtual feature amount generation unit 25 then generates virtual feature amounts from the feature amounts B by using the method 1-2 described above. FIG. 7 is a diagram for explaining an example of generating virtual feature amounts based on the feature amounts B. As illustrated in FIG. 7, the virtual feature amount generation unit 25 generates two virtual feature amounts C according to the distribution (average and dispersion) of the feature amounts B.

For example, the virtual feature amount generation unit 25 calculates an average value and a dispersion value of each dimension of the feature amounts B of each class. With reference to FIG. 7, the virtual feature amount generation unit 25 calculates the average value "6.30" and the dispersion value "7.90", by using the feature amount B "8.71" of the data D1, the feature amount B "5.25" of the data D2, the feature amount B "8.85" of the data D3, the feature amount "8.65" of the data D4, the feature amount B "5.29" of the virtual data V1, and the feature amount B "1.06" of the virtual data V2.

Similarly, the virtual feature amount generation unit 25 calculates the average value "6.58" and the dispersion value "0.23", by using the feature amount B "6.41" of the data D1, the feature amount B "6.60" of the data D2, the feature amount B "5.80" of the data D3, the feature amount B "6.54" of the data D4, the feature amount B "7.44" of the virtual data V1, and the feature amount B "6.73" of the virtual data V2.

Similarly, the virtual feature amount generation unit 25 calculates the average value "5.07" and the dispersion value "2.67", by using the feature amount B "4.07" of the data D1, the feature amount B "5.99" of the data D2, the feature amount B "6.18" of the data D3, the feature amount B "6.96" of the data D4, the feature amount B "5.23" of the virtual data V1, and the feature amount B "2.01" of the virtual data V2.

Moreover, the virtual feature amount generation unit 25 calculates the average value "1.37" and the dispersion value "1.17", by using the feature amount B "1.67" of the data D1, the feature amount B "0.17" of the data D2, the feature amount B "0.06" of the data D3, the feature amount B "2.80" of the data D4, the feature amount B "0.90" of the virtual data V1, and the feature amount B "2.62" of the virtual data V2.

Furthermore, the virtual feature amount generation unit 25 generates virtual data V3 of the virtual class and virtual data V4 of the virtual class, by using the values sampled from the normal distribution of the average value and the dispersion value calculated for each dimension. For example, the virtual feature amount generation unit 25 sets the value "4.94" sampled from the normal distribution of the average value "6.30" and the dispersion value "7.90", the value "6.17" sampled from the normal distribution of the average value "6.58" and the dispersion value "0.23", the value "5.62" sampled from the normal distribution of the average value "5.07" and the dispersion value "2.67", and the value "0.25" sampled from the normal distribution of the average value "1.37" and the distribution value "1.17", as the feature amounts of the virtual data V3 of the virtual class. The virtual feature amount generation unit 25 also generates the feature amounts of the virtual data V4 of the virtual class using the same method.

Generation of Final Feature Amounts C

Figure 8:
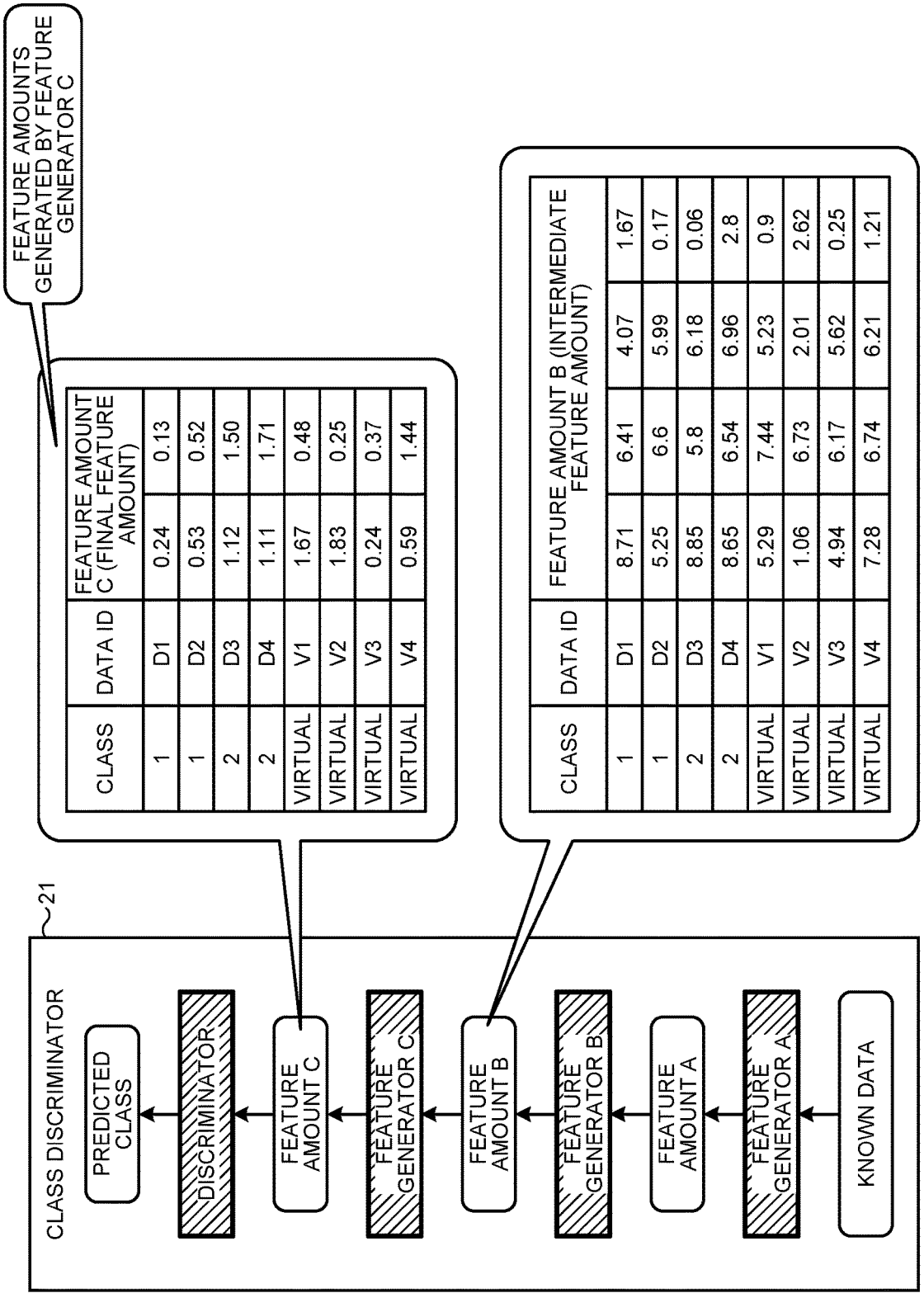
FIG. 8 is a diagram for explaining an example of generating feature amounts C.

Next, the feature amount generation unit 24 acquires the final feature amounts (feature amounts C) illustrated in FIG. 8, by supplying the feature amounts of eight pieces of data generated in FIG. 7 to the feature generator C. FIG. 8 is a diagram for explaining an example of generating the feature amounts C. As illustrated in FIG. 8, the feature amount generation unit 24 acquires "0.24 and 0.13" as the feature amounts C of the data D1 of the class 1, acquires "0.53 and 0.52" as the feature amounts C of the data D2 of the class 1, acquires "1.12 and 1.50" as the feature amounts C of the data D3 of the class 2, and acquires "1.11 and 1.71" as the feature amounts C of the data D4 of the class 2. Similarly, the feature amount generation unit 24 acquires "1.67 and 0.48" as the feature amounts C of the virtual data V1 of the virtual class, acquires "1.83 and 0.25" as the feature amounts C of the virtual data V2 of the virtual class, acquires "0.24 and 0.37" as the feature amounts C of the virtual data V3 of the virtual class, and acquires "0.59 and 1.44" as the feature amounts C of the virtual data V4 of the virtual class.

Discrimination Result of Predicted Class: First Example)

Then, when the final feature amounts (feature amounts C) illustrated in FIG. 8 are supplied to the discriminator, the class discriminator 21 outputs the discrimination result of the predicted class (probability of predicted class). In this example, the probability of predicted class is a probability indicating to which class the input data to be discriminated belongs, and in general, the highest probable class is discriminated as the class of the data to be discriminated.

Figure 9:
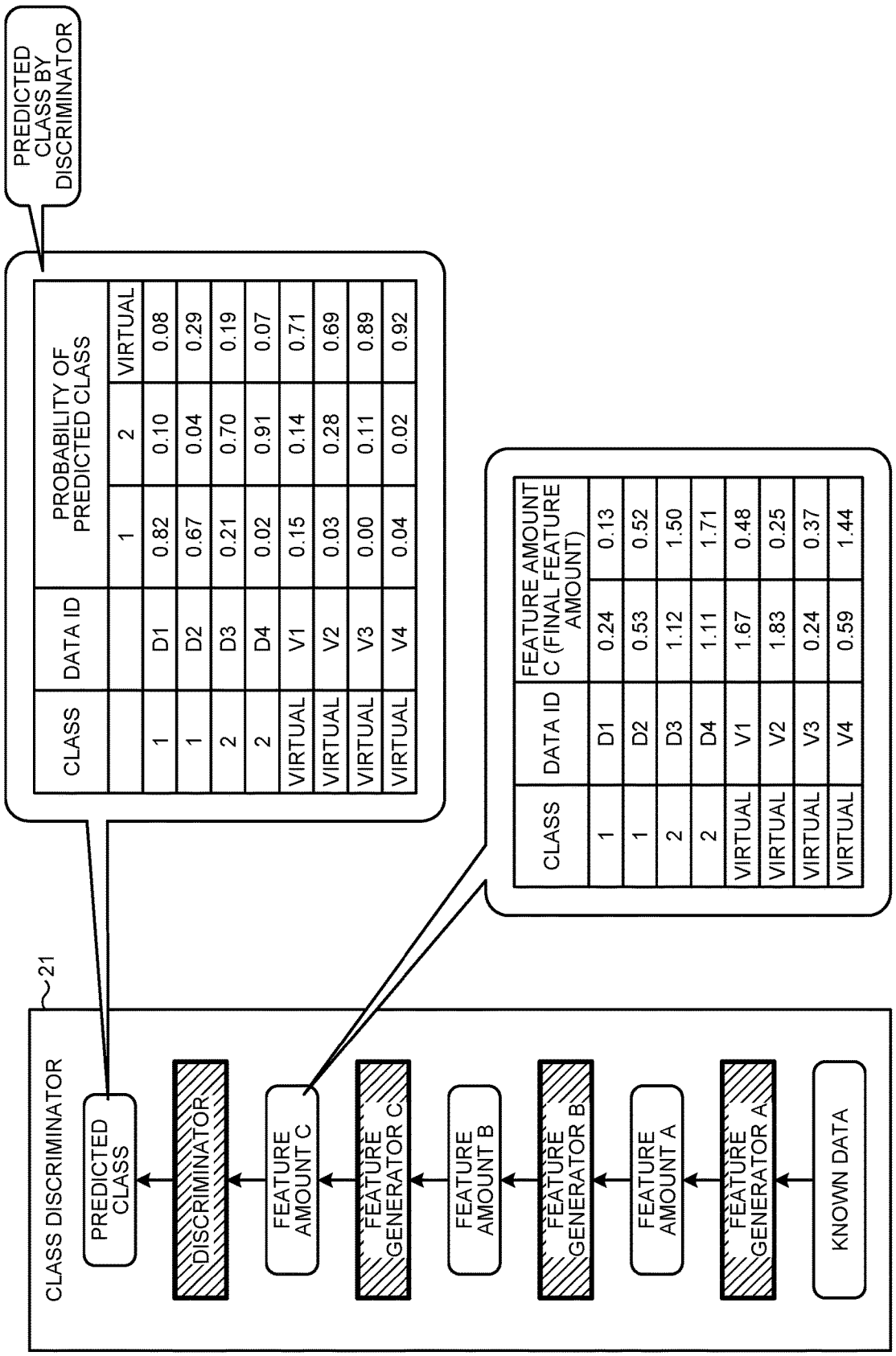
FIG. 9 is a diagram for explaining a prediction result of a predicted class by a discriminator.

FIG. 9 is a diagram for explaining a prediction result of a predicted class by a discriminator. As illustrated in FIG. 9, for the data D1 of the class 1, the class discriminator 21 outputs "class 1=0.82, class 2=0.10, and virtual class=0.08" as the probability of the predicted class, on the basis of the feature amounts C of the input data D1. For the data D2 of the class 1, the class discriminator 21 outputs "class 1=0.67, class 2=0.04, and virtual class=0.29" as the probability of the predicted class, on the basis of the feature amounts C of the input data D2.

Moreover, for the data D3 of the class 2, the class discriminator 21 outputs "class 1=0.21, class 2=0.70, and virtual class=0.19" as the probability of the predicted class, on the basis of the feature amounts C of the input data D3. For the data D4 of the class 2, the class discriminator 21 outputs "class 1=0.02, class 2=0.91, and virtual class=0.07" as the probability of the predicted class, on the basis of the feature amounts C of the input data D4.

Furthermore, for the virtual data V1 of the virtual class, the class discriminator 21 outputs "class 1=0.15, class 2=0.14, and virtual class=0.71" as the probability of the predicted class, on the basis of the feature amounts C of the input virtual data V1. For the virtual data V2 of the virtual class, the class discriminator 21 outputs "class 1=0.03, class 2=0.28, and virtual class=0.69" as the probability of the predicted class, on the basis of the feature amounts C of the input virtual data V2.

Similarly, for the virtual data V3 of the virtual class, the class discriminator 21 outputs "class 1=0.00, class 2=0.11, and virtual class=0.89" as the probability of the predicted class, on the basis of the feature amounts C of the input virtual data V3. For the virtual data V4 of the virtual class, the class discriminator 21 outputs "class 1=0.04, class 2=0.02, and virtual class=0.92" as the probability of the predicted class, on the basis of the feature amounts C of the input virtual data V4.

Learning: Method 2-1

Figure 10:
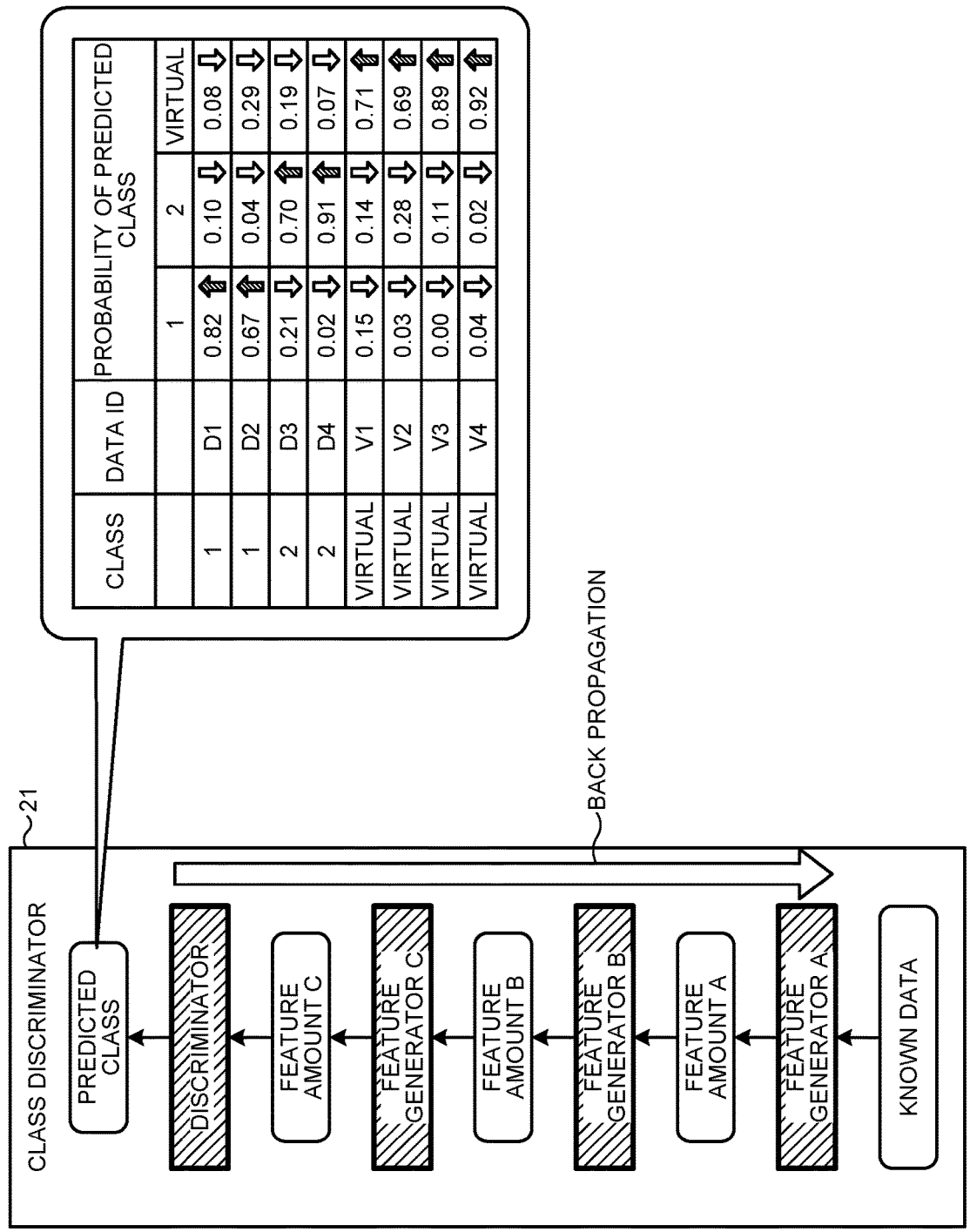
FIG. 10 is a diagram for explaining an example of learning so that the probability of a correct class is increased.

Then, by using the method 2-1 described above, the second learning unit 26 learns the class discriminator 21 (entire learning model) by the back propagation method and the like so that the probability of a correct class is increased. FIG. 10 is a diagram for explaining an example of learning so that the probability of a correct class is increased. As illustrated in FIG. 10, for the data D1 and the data D2 of the class 1, the second learning unit 26 learns the learning model so that the probability of the class 1 of the predicted class is increased, and the probabilities of the class 2 of the predicted class and the virtual class are reduced. Moreover, for the data D3 and the data D4 of the class 2, the second learning unit 26 learns the learning model so that the probability of the class 2 of the predicted class is increased, and the probabilities of the class 1 of the predicted class and the virtual class are reduced. On the other hand, for the data V1, V2, V3, and V4 of the virtual class, the second learning unit 26 learns the learning model so that the probability of the virtual class of the predicted class is increased, and the probabilities of the class 1 and the class 2 of the predicted class are reduced.

Discrimination Result of Predicted Class (First Example) and Learning (Method 2-2)

Figure 11:
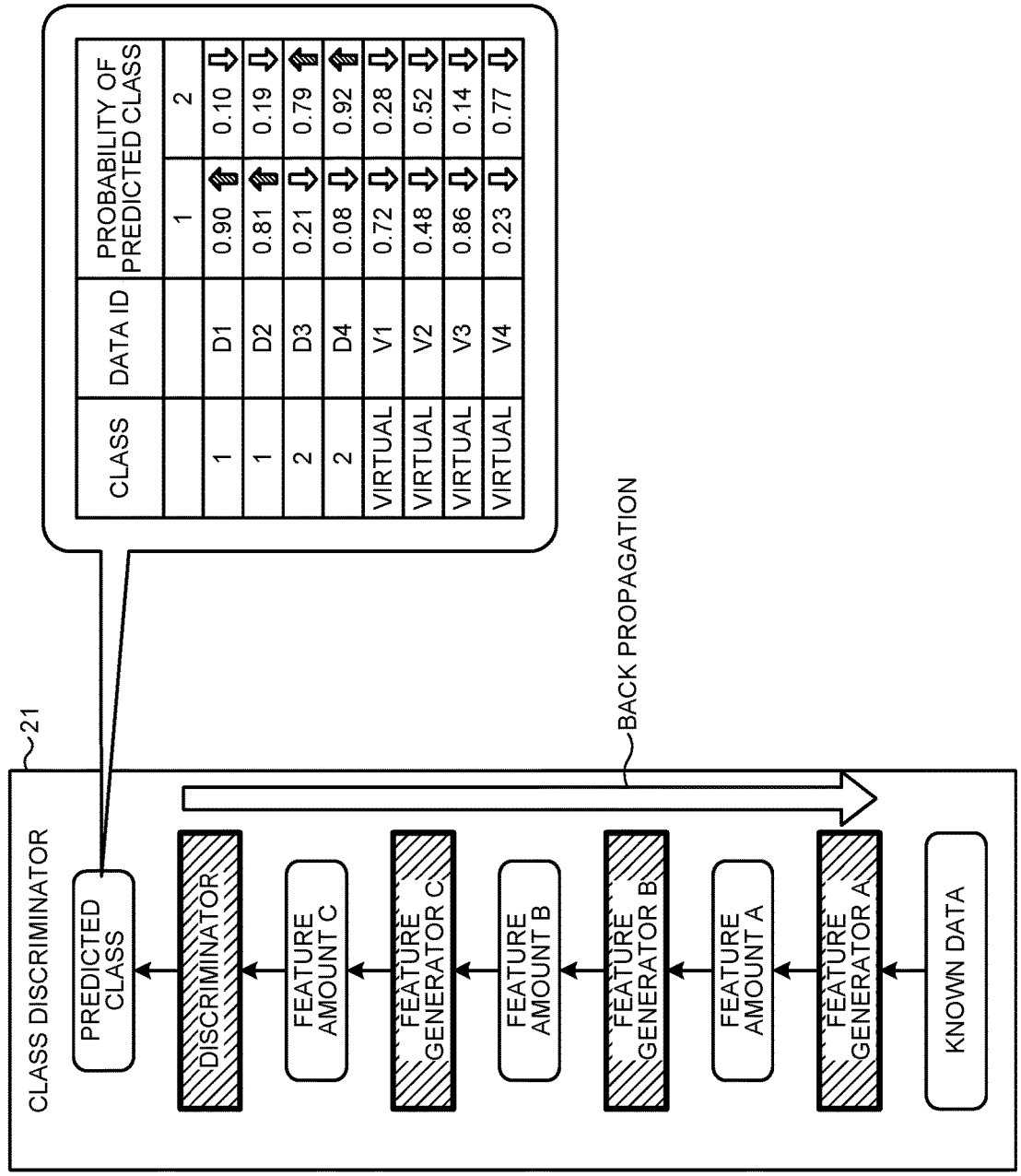
FIG. 11 is a diagram for explaining an example of learning so that the probability of a virtual class is reduced.

In FIG. 10, the learning example using the method 2-1 described above has been explained. In FIG. 11, the learning method using the method 2-2 described above will be explained. FIG. 11 is a diagram for explaining an example of learning so that the probability of a virtual class is reduced.

As illustrated in FIG. 11, for the data D1 of the class 1, the class discriminator 21 outputs "class 1=0.90 and class 2=0.10" as the probability of the predicted class, on the basis of the feature amounts C. For the data D2 of the class 1, the class discriminator 21 outputs "class 1=0.81 and class 2=0.19" as the probability of the predicted class, on the basis of the feature amounts C. Moreover, for the data D3 of the class 2, the class discriminator 21 outputs "class 1=0.21 and class 2=0.79" as the probability of the predicted class, on the basis of the feature amounts C. For the data D4 of the class 2, the class discriminator 21 outputs "class 1=0.08 and class 2=0.92" as the probability of the predicted class, on the basis of the feature amounts C.

Moreover, for the virtual data V1 of the virtual class, the class discriminator 21 outputs "class 1=0.72 and class 2=0.28" as the probability of the predicted class, on the basis of the feature amounts C. For the virtual data V2 of the virtual class, the class discriminator 21 outputs "class 1=0.48 and class 2=0.52" as the probability of the predicted class, on the basis of the feature amounts C. Similarly, for the virtual data V3 of the virtual class, the class discriminator 21 outputs "class 1=0.86 and class 2=0.14" as the probability of the predicted class, on the basis of the feature amounts C. For the virtual data V4 of the virtual class, the class discriminator 21 outputs "class 1=0.23 and class 2=0.77" as the probability of the predicted class, on the basis of the feature amounts C.

Then, for the data D1 and the data D2 of the class 1, the second learning unit 26 learns the learning model so that the probability of the class 1 of the predicted class is increased, and the probability of the class 2 of the predicted class is reduced. Moreover, for the data D3 and the data D4 of the class 2, the second learning unit 26 learns the learning model so that the probability of the class 2 of the predicted class is increased, and the probability of the class 1 of the predicted class is reduced. On the other hand, for the data V1, V2, V3, and V4 of the virtual class, the second learning unit 26 learns the learning model so that the probabilities of the class 1 and the class 2 of the predicted class are reduced.

Processing Flow

Figure 12:
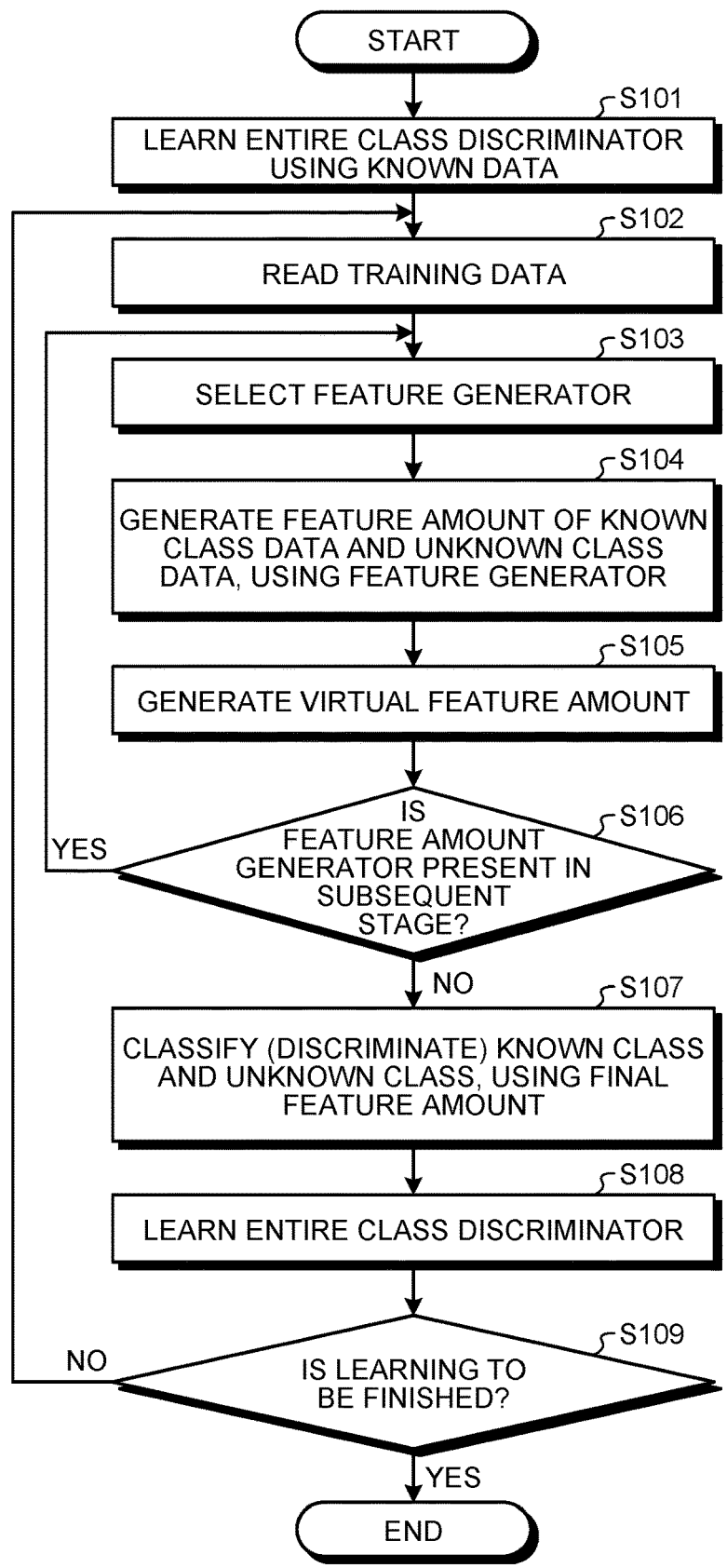
FIG. 12 is a flowchart illustrating a processing flow.

FIG. 12 is a flowchart illustrating a processing flow. As illustrated in FIG. 12, the first learning unit 22 learns the entire class discriminator 21 using the training data of the known class (S101). In this process, the first learning unit 22 can learn any desired amount such as a single step or a single iteration.

Next, the feature amount generation unit 24 reads out the training data (S102), and selects the first unprocessed feature amount generator, among the feature generators formed in a multistage manner (S103).

Then, the feature amount generation unit 24 generates the feature amount of the known class data or the feature amount of the unknown class (virtual class) data, by supplying training data to the selected feature amount generator (S104). When the selected feature amount generator is the first feature amount generator, only the feature amount of the known class data is generated.

Then, the virtual feature amount generation unit 25 generates the virtual feature amount corresponding to the virtual class, by using the feature amount generated by the feature amount generation unit 24 (S105). When an unprocessed feature amount generator is present in the subsequent stage (Yes at S106), the processes after S103 will be executed for the next feature amount generator.

Alternatively, when an unprocessed feature amount generator is not present in the subsequent stage (No at S106), the class discriminator 21 classifies the known class and the unknown class by using the final feature amount (S107). Then, the second learning unit 26 learns the entire class discriminator 21, by using the classification result (prediction result), and the method 2-1 or the method 2-2 described above (S108).

To continue the learning (No at S109), the processes after S102 are repeated, and to finish the learning (Yes at S109), the process will be finished.

Effects

As described above, the learning device 10 generates random feature amounts by using the distribution of the intermediate feature amounts of the learning machine, as the feature amounts of the unknown class. The learning device 10 then sequentially generates the feature amounts of another unknown class by using the distribution of the feature amounts of the known class and the feature amounts of the unknown class. The learning device 10 then learns so that the feature amount of the unknown class is classified as the unknown class. In this manner, the feature space is divided by learning a form of discriminating the unknown class and the known class. Consequently, the unknown class data unable to suitably separate in the feature amount space for discriminating the known class can be suitably separated and discriminated. Thus, the learning device 10 can generate a learning model that can correctly output a supplied unknown class having features similar to those of the known class but are different from those of the known class is the unknown class, when the unknown class is supplied.

Figure 13:
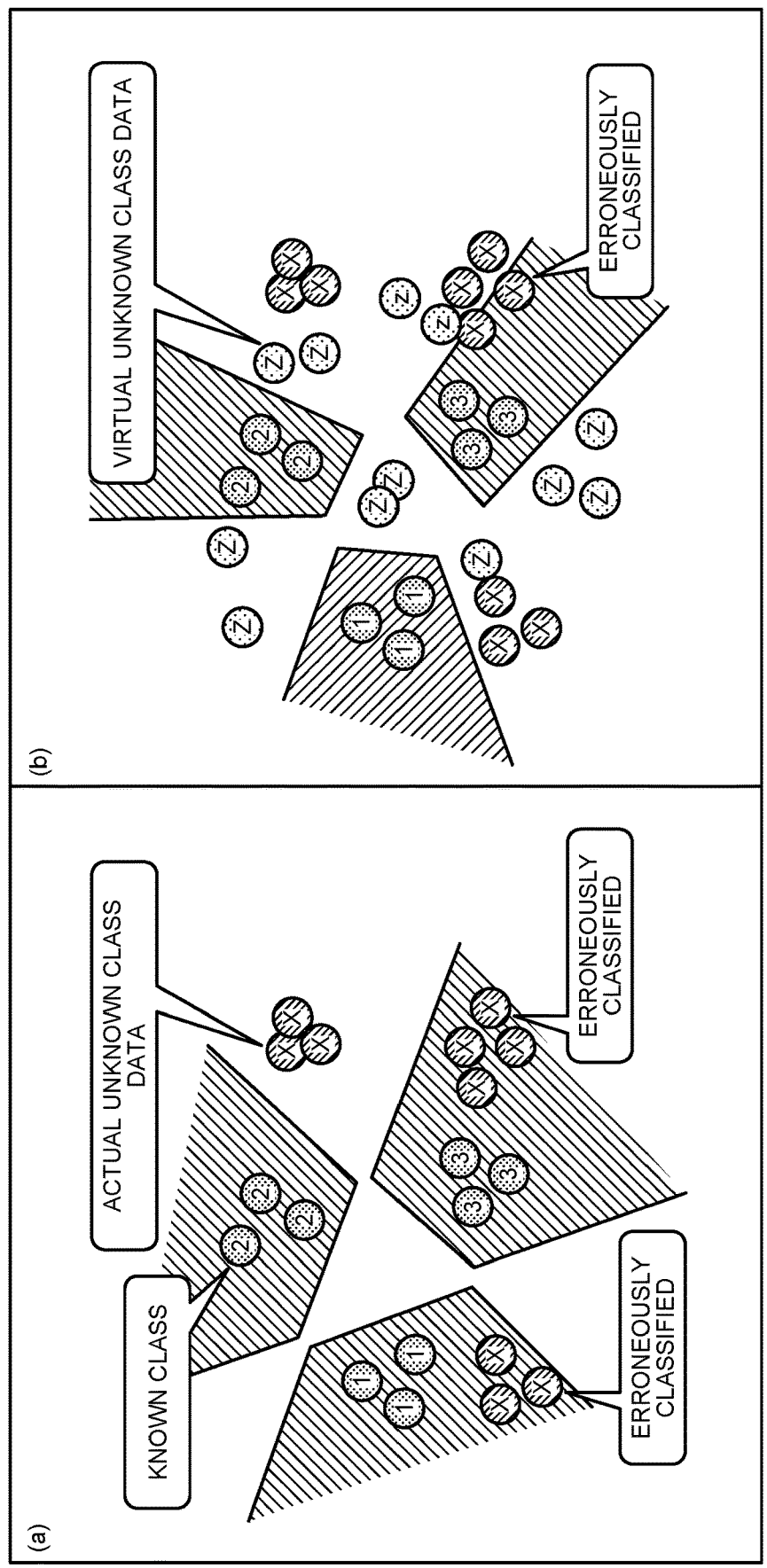
FIG. 13 is a diagram for explaining an example of dividing a class region by the first embodiment.

FIG. 13 is a diagram for explaining an example of dividing a class region by the first embodiment. As illustrated in FIG. 13(a), in a general learning method, the feature space used for space division is only created by classifying the data of the known class. Thus, the space division between the unknown class and the known class is not correct, and data X, which is an unknown class, is often erroneously detected. Alternatively, as illustrated in FIG. 13(b), in the learning method of the first embodiment, the feature amounts corresponding to the virtual unknown class are generated when the features are generated during the normal learning. Hence, the learning machine (class discriminator 21) that repeatedly generates the features in a multistage manner can be learned using the feature amounts. Consequently, it is possible to more accurately implement the space division between the unknown class and the known class, and reduce the erroneous detection of the data X and data Z that are unknown classes.

[b] Second Embodiment

While the embodiment of the present invention has been described above, it is to be understood that various other modifications may be made to the present invention in addition to the embodiment described above.

Learning Machine

Various learning methods such as a support vector machine (SVM), a gradient method, and a neural network may be adopted for the class discriminator 21 (learning machine) according to the first embodiment.

Selection of Method

In the first embodiment described above, the virtual feature amounts are generated first by using the method 1-1, and the virtual feature amounts are then generated by using the method 1-2. However, it is not limited thereto, and the first embodiment can be optionally changed by replacing the order or only using one of the methods multiple times. Moreover, the method 2-1 and the method 2-2 can be optionally selected.

System

The information including the process procedure, the control procedure, specific names, and various kinds of data and parameters indicated in the specification described above or in the drawings can be optionally changed, unless otherwise specified. Moreover, the specific examples, distributions, numerical values, and the like described in the embodiment are merely examples, and may be optionally changed.

Moreover, the components of the devices in the drawings are functionally conceptual, and need not be physically configured as illustrated. In other words, the specific mode of dispersion and integration of the devices is not limited to the ones illustrated in the drawings. That is, all or a part thereof can be functionally or physically dispersed or integrated in an optional unit, depending on various kinds of load, the status of use, and the like. Moreover, all or an optional part of the respective processing functions carried out in each device are implemented by a central processing unit (CPU) and a computer program analyzed and executed by the CPU, or may be implemented as hardware by wired logic.

Hardware

Figure 14:
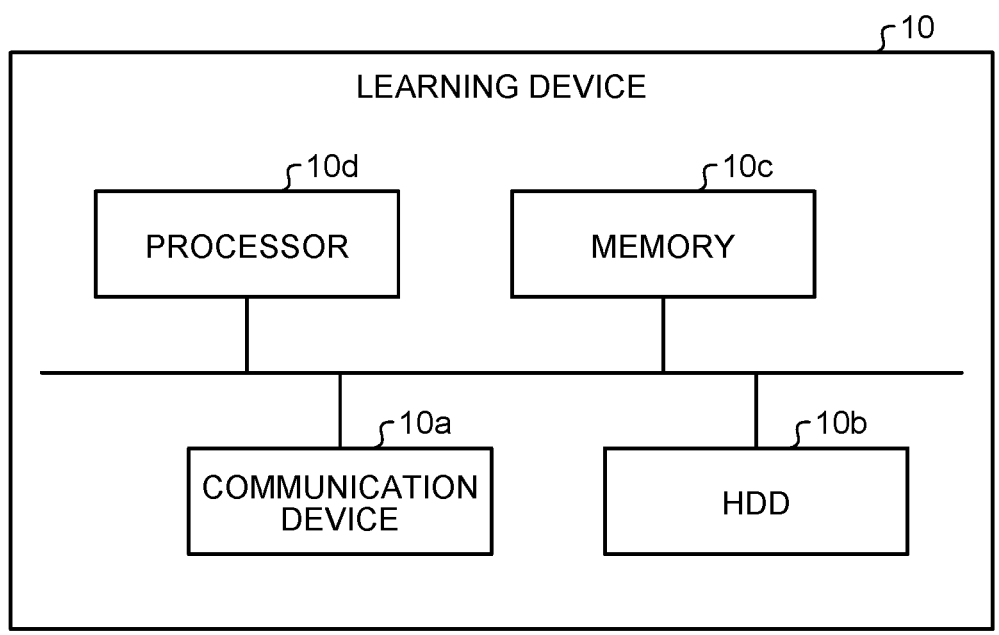
FIG. 14 is a diagram for explaining an example of a hardware configuration.
Figure 15:
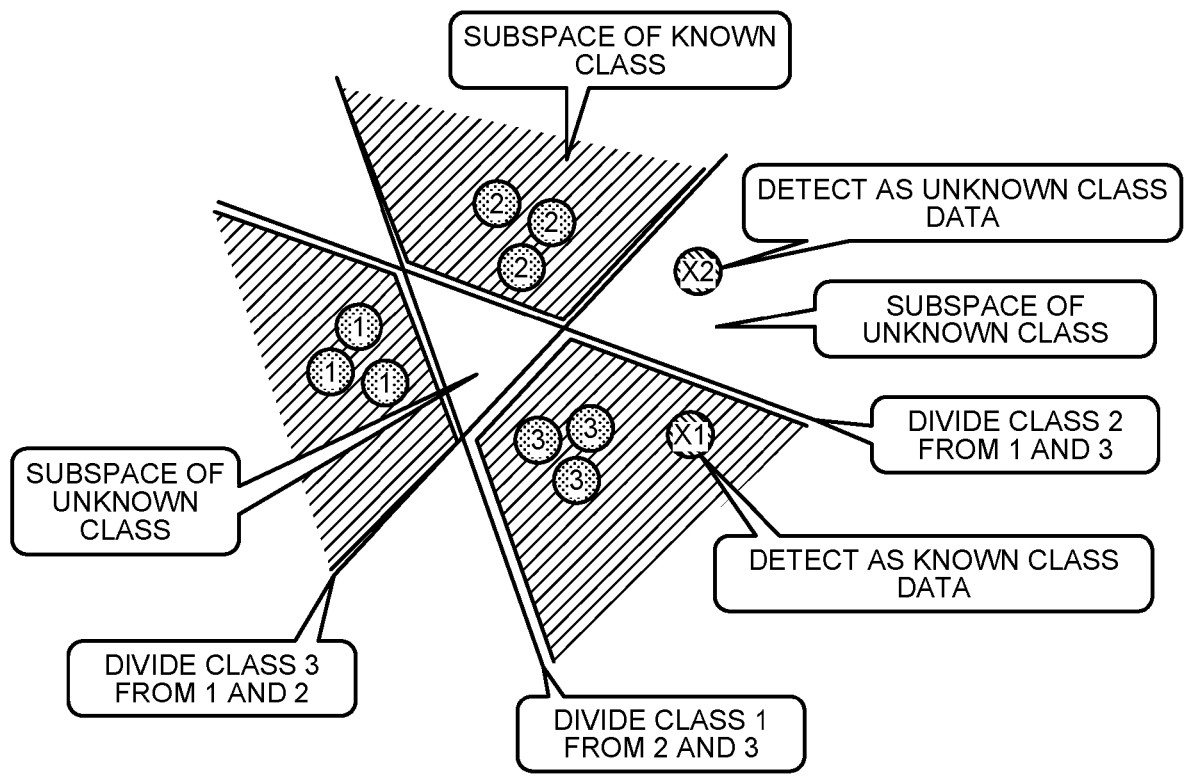
FIG. 15 is a diagram for explaining open set recognition.
Figure 16:
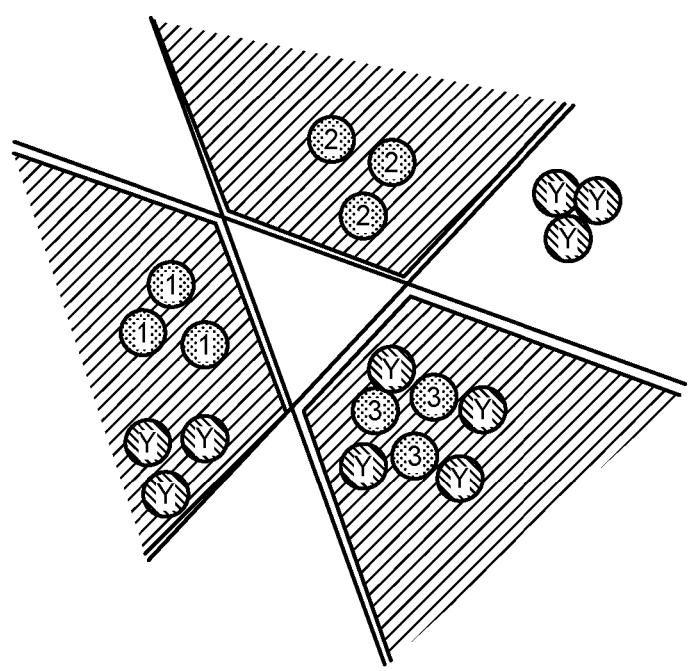
FIG. 16 is a diagram for explaining an erroneous detection of an unknown class.

FIG. 14 is a diagram for explaining an example of a hardware configuration. As illustrated in FIG. 14, the learning device 10 includes a communication device 10a, a hard disk drive (HDD) 10b, memory 10c, and a processor 10d. The units illustrated in FIG. 14 are connected to each other via a bus and the like.

The communication device 10a is a network interface card and the like, and communicates with another server. The HDD 10b stores therein a computer program and a DB for operating the functions illustrated in FIG. 2.

The processor 10d reads out a computer program for executing the processes similar to those of the processing units illustrated in FIG. 2 from the HDD 10b and the like, and develops the computer program on the memory 10c. Consequently, the process for executing the functions described in FIG. 2 and the like will be operated. In other words, the process executes the same functions as those of the processing units included in the learning device 10. More specifically, the processor 10d reads out a computer program having the same functions as those of the class discriminator 21, the first learning unit 22, the class processing unit 23, and the like, from the HDD 10b and the like. The processor 10d then executes the process that executes the same process as that of the class discriminator 21, the first learning unit 22, the class processing unit 23, and the like.

In this manner, the learning device 10 is operated as an information processing device that executes the learning method, by reading out and executing the computer program. Moreover, the learning device 10 can implement the same functions as those of the embodiments described above, by reading out the computer program from a storage medium using a medium reading device, and executing the read out computer program. The computer program referred to in the other embodiment is not limited to being executed by the learning device 10. For example, the present invention is similarly applicable when another computer or server executes a computer program, or the computer program is executed under the control of another computer and server.

The computer program can also be distributed via a network such as the Internet. The computer program is stored in a computer-readable recording medium such as a hard disk, a flexible disk (FD), a compact disc-read only memory (CD-ROM), a magneto-optical disc (MO), a digital versatile disc (DVD), and the like, and is executed by being read out from the recording medium such as a computer.

According to one embodiment, it is possible to improve the detection accuracy of an unknown class.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process comprising:
    executing learning of a discriminator that discriminates object data to a known class included in training data or an unknown class not included in the training data, using the training data;
    generating a feature value of the unknown class from at least a part of feature values that are output from a plurality of layers of the discriminator and correspond to the known class; and
    executing, using the feature values corresponding to the known class and the generated feature value of the unknown class, the learning of the discriminator so that a feature value of the known class and the generated feature value of the unknown class are separated.

2. The non-transitory computer-readable recording medium according to claim 1 having stored therein a program that causes the computer to execute a process, wherein
    the generating includes generating the feature value of the unknown class by using the feature value of the known class output from the layers in a course that the discriminator outputs a class discrimination result of the training data, while the discriminator is learning to discriminate the known class using the training data, and
    the executing includes executing the learning of the discriminator so as to be able to discriminate the known class and separate the feature value of the known class and the feature value of the unknown class.

3. The non-transitory computer-readable recording medium according to claim 1 having stored therein a program that causes the computer to execute a process, further comprising:
    generating the feature value of the unknown class from a plurality of the feature values of the known class output from a preceding layer in each of the layers formed in a multistage manner, and supplying the feature values of the known class and the feature value of the unknown class to a subsequent layer, wherein
    the executing includes executing the learning of the discriminator, based on a prediction result of discrimination output from a last layer of the layers.

4. The non-transitory computer-readable recording medium according to claim 3 having stored therein a program that causes the computer to execute a process, further comprising:
    outputting a probability of a known class determined to be the known class and a probability of an unknown class determined to be the unknown class, from the last layer of the layers, wherein
    the executing includes executing the learning of the discriminator, for the known class, so that the probability of the known class is improved and the probability of the unknown class is reduced, and for the unknown class, so that the probability of the unknown class is improved and the probability of the known class is reduced.

5. The non-transitory computer-readable recording medium according to claim 3 having stored therein a program that causes the computer to execute a process, further comprising:
    outputting a probability of a known class determined to be the known class from the last layer of the layers, wherein
    the executing includes executing the learning of the discriminator so that the probability of the known class is improved for the known class, and so that the probability of the known class is reduced for the unknown class.

6. The non-transitory computer-readable recording medium according to claim 3 having stored therein a program that causes the computer to execute a process, wherein
    the generating includes generating the feature value of the unknown class, by using feature values randomly selected from the feature values output from the layers of the discriminator.

7. The non-transitory computer-readable recording medium according to claim 3 having stored therein a program that causes the computer to execute a process, wherein
    the generating includes generating the feature value of the unknown class, by using an average and a dispersion of the feature values output from the layers of the discriminator.

8. A method comprising:
    executing, using a processor, learning of a discriminator that discriminates object data to a known class included in training data or an unknown class not included in the training data, using the training data;
    generating, using the processor, a feature value of the unknown class from at least a part of feature values that are output from a plurality of layers of the discriminator and correspond to the known class; and
    executing, using the processor, using the feature values corresponding to the known class and the generated feature value of the unknown class, the learning of the discriminator so that a feature value of the known class and the generated feature value of the unknown class are separated.

9. A learning device comprising:
    a memory; and
    a processor coupled to the memory and the processor configured to:
    execute learning of a discriminator for discriminating object data to a known class included in training data or an unknown class not included in the training data, using the training data;

generate a feature value of the unknown class from at least a part of feature values that are output from a plurality of layers of the discriminator and correspond to the known class; and execute, using the feature values corresponding to the known class and the generated feature value of the unknown class, the learning of the discriminator so that a feature value of the known class and the generated feature value of the unknown class are separated.

* * * * *